US012047184B2

(12) United States Patent
Zhou et al.

(10) Patent No.: US 12,047,184 B2
(45) Date of Patent: Jul. 23, 2024

(54) NON-DROPPING RULE FOR MINI-SLOT BASED REPETITION

(71) Applicant: QUALCOMM Incorporated, San Diego, CA (US)

(72) Inventors: Yan Zhou, San Diego, CA (US); Mostafa Khoshnevisan, San Diego, CA (US); Jing Sun, San Diego, CA (US); Xiaoxia Zhang, San Diego, CA (US); Tao Luo, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/186,343

(22) Filed: Feb. 26, 2021

(65) Prior Publication Data

US 2021/0297197 A1 Sep. 23, 2021

Related U.S. Application Data

(60) Provisional application No. 62/992,852, filed on Mar. 20, 2020.

(51) Int. Cl.
*H04W 74/08* (2009.01)
*H04L 1/1812* (2023.01)
(Continued)

(52) U.S. Cl.
CPC .......... *H04L 1/1896* (2013.01); *H04L 1/1819* (2013.01); *H04W 72/0446* (2013.01);
(Continued)

(58) Field of Classification Search
None
See application file for complete search history.

(56) References Cited

U.S. PATENT DOCUMENTS 11,160,028 B2    10/2021    Molavianjazi et al.
11,405,145 B2    8/2022    Xiong et al.
(Continued)

FOREIGN PATENT DOCUMENTS

CN    102447549 A    5/2012
CN    110447283 A    11/2019

OTHER PUBLICATIONS

International Search Report and Written Opinion—PCT/US2021/020239—ISA/EPO—dated Aug. 5, 2021.
(Continued)

*Primary Examiner* — Sithu Ko
(74) *Attorney, Agent, or Firm* — Loza & Loza, LLP

(57) ABSTRACT

Aspects relate to implementing a non-dropping rule for mini-slot based repetition of downlink channel data or control. In one example, cancelled repetition may be identified, non-cancelled remaining repetitions may be received, and acknowledgment feedback based on reception results may be generated. In another example, a plurality of time domain resource allocation (TDRA) candidate occasions may be identified where each occasion occurs within a different respective one of a plurality of mini-slots, each mini-slot carrying a different respective one of a plurality of downlink channel repetitions. A TDRA table may be maintained. The TDRA table may include TDRA entries such as location information of the plurality of TDRA candidate occasions associated with the plurality of downlink channel repetitions. The TDRA table may be maintained when at least one of the plurality of downlink channel repetitions is not decoded. A wireless communication device may refrain from dropping non-decoded downlink channel repetitions.

28 Claims, 8 Drawing Sheets

(51) Int. Cl.
*H04L 1/1867* (2023.01)
*H04W 72/0446* (2023.01)
*H04W 72/23* (2023.01)
*H04W 72/56* (2023.01)
*H04W 76/30* (2018.01)

(52) U.S. Cl.
CPC ........... *H04W 72/23* (2023.01); *H04W 72/56* (2023.01); *H04W 76/30* (2018.02)

(56) References Cited

U.S. PATENT DOCUMENTS

| | | | |
|---|---|---|---|
| 11,638,240 | B2 | 4/2023 | Park et al. |
| 2013/0115987 | A1* | 5/2013 | Yoo ..................... H04L 25/0328 455/501 |
| 2015/0358104 | A1 | 12/2015 | Ohwatari et al. |
| 2018/0270880 | A1 | 9/2018 | Hosseini et al. |
| 2018/0279266 | A1* | 9/2018 | Li ........................ H04L 1/1825 |
| 2018/0279326 | A1* | 9/2018 | Park ...................... H04L 5/0096 |
| 2019/0149365 | A1* | 5/2019 | Chatterjee ........... H04L 25/0226 370/329 |
| 2019/0254053 | A1* | 8/2019 | Ying ..................... H04L 5/0094 |
| 2019/0306848 | A1* | 10/2019 | Zhou .................... H04W 72/044 |
| 2019/0349904 | A1* | 11/2019 | Kwak .................... H04W 72/23 |
| 2020/0092068 | A1* | 3/2020 | Yang ..................... H04L 1/1858 |
| 2020/0214084 | A1 | 7/2020 | Panteleev et al. |
| 2020/0275431 | A1 | 8/2020 | Bae et al. |
| 2020/0314817 | A1 | 10/2020 | Sun et al. |
| 2020/0374911 | A1 | 11/2020 | Lee et al. |
| 2021/0050955 | A1* | 2/2021 | Park ...................... H04B 7/0456 |
| 2021/0219329 | A1* | 7/2021 | Zhou ...................... H04L 1/189 |
| 2021/0227570 | A1* | 7/2021 | Park ....................... H04L 1/189 |
| 2021/0360610 | A1* | 11/2021 | Kim ...................... H04L 5/0094 |
| 2021/0399845 | A1* | 12/2021 | Lei ........................ H04L 1/1896 |
| 2022/0007399 | A1* | 1/2022 | Rastegardoost ...... H04L 5/0073 |
| 2022/0104237 | A1* | 3/2022 | Muruganathan .. H04W 72/1273 |
| 2022/0116156 | A1 | 4/2022 | Takeda et al. |
| 2022/0173843 | A1* | 6/2022 | Nakashima ........... H04L 1/1854 |
| 2022/0209901 | A1* | 6/2022 | Lei ........................ H04L 1/1685 |
| 2022/0386156 | A1* | 12/2022 | Park ...................... H04W 24/10 |
| 2023/0023538 | A1 | 1/2023 | Zhou et al. |

OTHER PUBLICATIONS

Nokia (Rapporteur): "E-mail Discussion Summary [103bis#41] [NR/IIOT] Intra-UE Prioritization (Nokia)", 3GPP Draft, 3GPP TSG-RAN WG2 #104, R2-1817579, 3rd Generation Partnership Project (3GPP), Mobile Competence Centre, 650, Route Des Lucioles, F-06921 Sophia-Antipolis Cedex, France, Nov. 16, 2018 (Nov. 16, 2018), pp. 1-48, XP051481479, Retrieved from the Internet: URL: http://www.3gpp.org/ftp/tsg%5Fran/WG2%5FRL2/TSGR2%5F104/Docs/R2%2D1817579%2Ezip. [Retrieved on Nov. 12, 2018], Paragraph [02.1], Sections 2.3 to 2.6.

NTT Docomo, et al., "UCI Enhancements for URLLCU", 3GPP Draft, 3GPP TSG RAN WG1 #96, R1-1902805_UCI Enhancement, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600500, 10 pages, Retrieved from the Internet: URL: http://www.3gpp.org/ftp/tsg%5Fran/WG1%5FRL1/TSGR1%5F96/Docs/R1%2D1902805%2EZip , [retrieved on Feb. 16, 2019], figures 1-12, Section 2.

Qualcomm, "Summary of Email Discussion [98-NR-15] on Down link Out-of-Order", 3GPP Draft, 3GPP TSG RAN WG1 #98, R1-1911504, Summary of Email Discussion 98-NR-15 on Downlink Out-of-Order Operation, 3rd Generation Partnership Project (3GPP), Mobile Competence Centre, 650, Route Des Lucioles, F-06921 S, vol. RAN WG1, No. Prague, Czech Republic, Aug. 26, 2019-Aug. 30, 2019, Oct. 22, 2019 (Oct. 22, 2019), XP051798769, 26 Pages, Retrieved from the Internet: URL: https://ftp.3gpp.org/tsg_ran/WG1_RL1/TSGR1_98b/Docs/R1-1911504.zip. R1-1911504 Summary of Email Discussion 98-NR-15 on Downlink Out-of-Order Operation.doc. [Retrieved on Oct. 22, 2019] p. 7-p. 8 p. 11 p. 14 p. 17 p. 19 p. 22-p. 24.

* cited by examiner

NON-DROPPING RULE FOR MINI-SLOT BASED REPETITION

CROSS-REFERENCE TO RELATED APPLICATIONS

This application for patent claims priority to and the benefit of provisional patent application No. 62/992,852 entitled "Non-Dropping Rule For Mini-Slot Based Repetition" filed in the United States Patent and Trademark Office on Mar. 20, 2020, the entire content of which is incorporated herein by reference as if fully set forth below in its entirety and for all applicable purposes.

TECHNICAL FIELD

The technology discussed below relates generally to wireless communication systems, and more particularly, to rules related to dropping of downlink data channels.

INTRODUCTION

In wireless communications networks, downlink data may be transmitted from a network access node, such as a gNodeB, to a wireless communication device using an over-the-air interface. The frequency-time resources used in the over-the-air interface may be ordered into frames, subframes, and slots. Downlink data may be communicated via the over-the-air interface in a physical downlink shared channel (PDSCH) that may be located, for example, within a slot. Next generation wireless communication networks, such as 5G networks, provide for mini-slots to be implemented within a slot. Mini-slots, like slots, may include a plurality of symbols in the time domain, each configured to carry uplink (UL) data, downlink (DL) data, or a combination of UL and DL data. The PDSCH may be repeated on a plurality of occasions within a slot, where each occasion occurs within one mini-slot within a given slot.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

According to one aspect, a method of wireless communication at a wireless communication device is disclosed. The method includes identifying at least one of a plurality of repeated communications that is cancelled, receiving remaining repeated communications of the plurality of repeated communications that are not cancelled, and generating acknowledgment feedback information for the remaining repeated communications.

In one example, a wireless communication device in a wireless communication network that includes a wireless transceiver, a memory, and a processor communicatively coupled to the wireless transceiver and the memory are disclosed. The processor and the memory are configured to identify at least one of a plurality of repeated communications that is cancelled, receive remaining repeated communications of the plurality of repeated communications that are not cancelled; and generate acknowledgment feedback information for the remaining repeated communications.

In another example, another method of wireless communication at a wireless communication device is disclosed. The method includes identifying a plurality of time domain resource allocation (TDRA) candidate occasions, each TDRA candidate occasion occurring within a different respective one of a plurality of mini-slots, each of the plurality of mini-slots carrying a different respective one of a plurality of downlink channel repetitions. The method further includes maintaining, in a TDRA table, TDRA entries including location information of the plurality of TDRA candidate occasions associated with the plurality of downlink channel repetitions, when at least one of the plurality of downlink channel repetitions is not decoded.

In still another example, another wireless communication device in a wireless communication network that includes a wireless transceiver, a memory, and a processor communicatively coupled to the wireless transceiver and the memory are disclosed. The processor and the memory are configured to identify a plurality of time domain resource allocation (TDRA) candidate occasions, each TDRA candidate occasion occurring within a different respective one of a plurality of mini-slots, each of the plurality of mini-slots carrying a different respective one of a plurality of downlink channel repetitions. The processor and the memory are further configured to maintain, in a TDRA table, TDRA entries including location information of the plurality of TDRA candidate occasions associated with the plurality of downlink channel repetitions, when at least one of the plurality of downlink channel repetitions is not decoded.

These and other aspects of the invention will become more fully understood upon a review of the detailed description, which follows. Other aspects, features, and examples will become apparent to those of ordinary skill in the art, upon reviewing the following description of specific, exemplary examples in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples it should be understood that such exemplary examples can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence (AI) enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Figure 1:
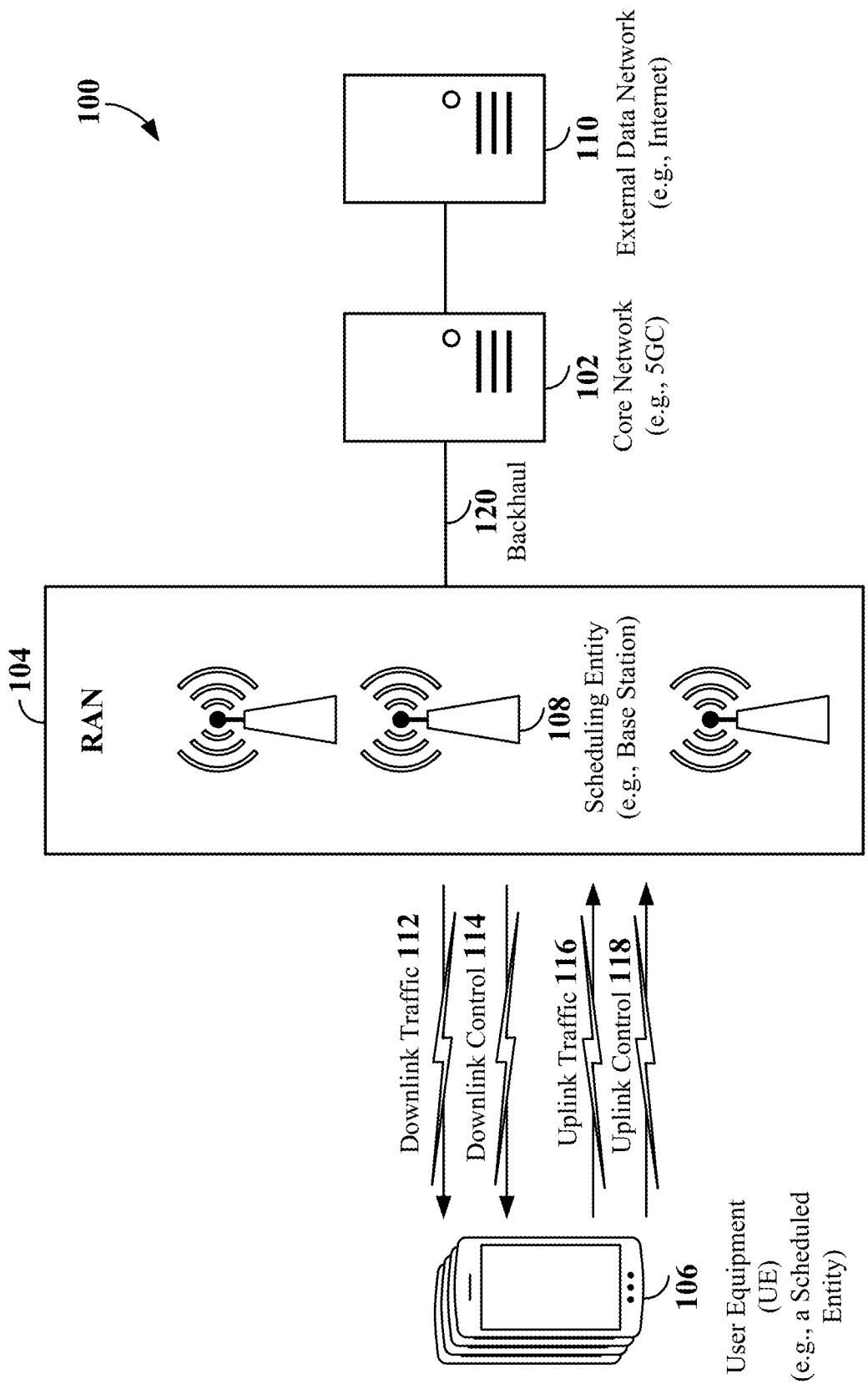
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102 (e.g., a 5G core (5GC) network), a radio access network (RAN) 104, and a user equipment (UE) 106 (e.g., a scheduled entity). By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of scheduling entities (schematically illustrated as scheduling entity 108) also referred to herein as base stations. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Wireless communication between the RAN 104 and the UE 106 may be described as utilizing an air interface. Transmissions over the air interface from a base station (e.g., scheduling entity 108) to one or more UEs (e.g., similar to UE 106) may be referred to as downlink (DL) transmission. In accordance with certain aspects of the present disclosure, the term downlink may refer to a point-to-multipoint transmission originating at a scheduling entity 108 (e.g., base station). Another way to describe this scheme may be to use the term broadcast channel multiplexing. Transmissions from a UE (e.g., UE 106) to a scheduling entity 108 (e.g., a base station) may be referred to as uplink (UL) transmissions. In accordance with further aspects of the present disclosure, the term uplink may refer to a point-to-point transmission originating at a scheduled entity (e.g., UE 106).

In some examples, access to the air interface may be scheduled, wherein a scheduling entity 108 (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, a plurality of UEs (e.g., a plurality of UE 106), which may be scheduled entities, may utilize resources allocated by the scheduling entity 108.

Base stations, represented in both the singular and the plural by scheduling entity 108, are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities (e.g., one or more UE 106). Broadly, the scheduling entity 108 is a node or device responsible for scheduling traffic in a wireless communication network, including the downlink traffic 112 and, in some examples, uplink traffic 116 from one or more scheduled entities (e.g., one or more UE 106) to the scheduling entity 108. On the other hand, the scheduled entity (e.g., one or more UE 106) is a node or device that receives downlink control information 114, including but not limited to scheduling information (e.g., a grant), synchronization or timing information, or other control information from another entity in the wireless communication network such as the scheduling entity 108.

In general, scheduling entities, as graphically represented in the singular and plural by scheduling entity 108, may include a backhaul interface for communication with a backhaul portion 120 of the wireless communication system 100. The backhaul portion 120 may provide a link between a scheduling entity 108 and the core network 102. Further, in some examples, a backhaul network may provide interconnection between the respective base stations (each similar to scheduling entity 108). Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
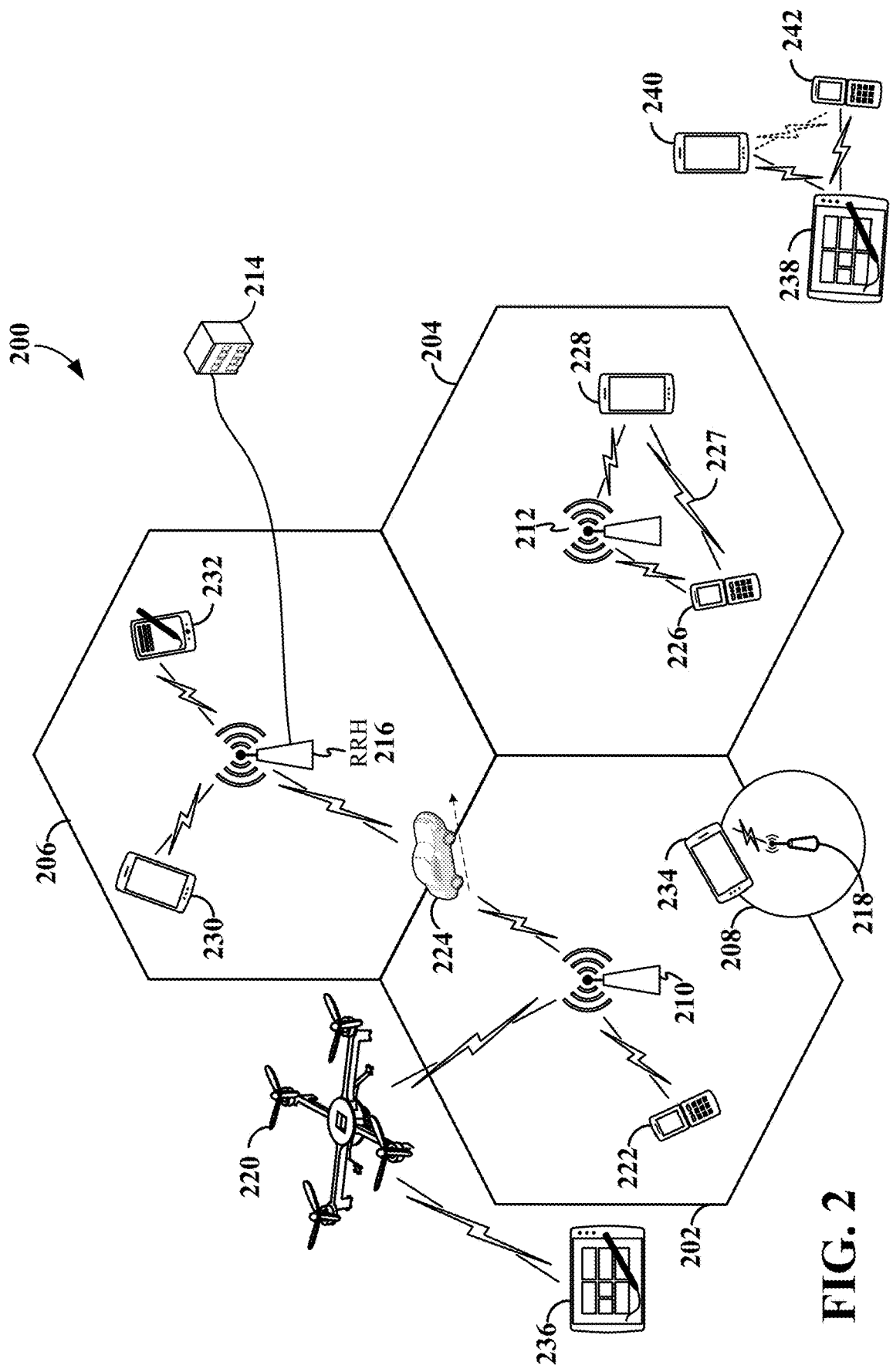
FIG. 2 is a schematic illustration of a radio access network (RAN) according to some aspects.

Referring now to FIG. 2, as an illustrative example without limitation, a schematic illustration of a radio access network (RAN) 200 according to some aspects is provided. In some examples, the RAN 200 may be the same as the RAN 104 described above and illustrated in FIG. 1. The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). Cells 202, 204, and 206 may be referred to as macrocells and cell 208 may be referred to as a small cell. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 2, two base stations, base station 210 and base station 212 are shown in cells 202 and 204. A third base station, base station 214, is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208 (e.g., a small cell, a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints. It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses.

FIG. 2 further includes a quadcopter or drone, which may be configured to function as a base station, or more specifically as a mobile base station 220. That is, in some examples, a cell may not necessarily be stationary, and the geographic area of the cell may move according to the location of a mobile base station 220 such as a quadcopter or drone.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 200 is illustrated supporting wireless communication for multiple mobile apparatuses. A mobile apparatus may be referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services. A UE may include a number of hardware structural components sized, shaped, and arranged to help in communication; for example, such components may include antennas, antenna arrays, RF chains, amplifiers, one or more processors, etc. electrically coupled to each other.

Within the present document, a "mobile" apparatus need not necessarily have a capability to move and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 200, the cells may include UEs that may be in communication with one or more sectors of each cell. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. Here, each base station 210, 212, 214, 218, and 220 may be configured to provide an access point to a core network (not shown) for all the UEs in the respective cells. In another example, the mobile base station 220 (e.g., the quadcopter) may be configured to function as a UE. For example, the mobile base station 220 may operate within cell 202 by communicating with base station 210.

Wireless communication between a RAN 200 and a UE (e.g., UE 222 or 224) may be described as utilizing an air interface. Transmissions over the air interface from a base station (e.g., base station 210) to one or more UEs (e.g., UE 222 and 224) may be referred to as downlink (DL) transmission. In accordance with certain aspects of the present disclosure, the term downlink may refer to a point-to-multipoint transmission originating at a scheduling entity (e.g., base station 210). Another way to describe this scheme may be to use the term broadcast channel multiplexing. Transmissions from a UE (e.g., UE 222) to a base station (e.g., base station 210) may be referred to as uplink (UL) transmissions. In accordance with further aspects of the present disclosure, the term uplink may refer to a point-to-point transmission originating at a scheduled entity (e.g., UE 222).

For example, DL transmissions may include unicast or broadcast transmissions of control information and/or traffic information (e.g., user data traffic) from a base station (e.g., base station 210) to one or more UEs (e.g., UEs 222 and 224), while UL transmissions may include transmissions of control information and/or traffic information originating at a UE (e.g., UE 222). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In the RAN 200, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 may move from the geographic area corresponding to its serving cell, cell 202, to the geographic area corresponding to a neighbor cell, cell 206. When the signal strength or quality from the neighbor cell, cell 206, exceeds that of its serving cell, cell 202, for a given amount of time, the UE 224 may transmit a reporting message to its serving base station, base station 210, indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, UE 238 is illustrated communicating with UEs 240 and 242. In some examples, the UE 238 is functioning as a scheduling entity, while the UEs 240 and 242 may function as scheduled entities. In other examples, sidelink or other type of direct link signals may be communicated directly between UEs without necessarily relying on scheduling or control information from another entity. In one example, two or more UEs (e.g., UEs 226 and 228) may communicate with each other using direct link signals 227 (e.g., sidelink, Bluetooth, and/or other types of direct link signals) without relaying that communication through a base station (e.g., base station 212). In another example, UEs 238, 240, and 242 may communicate over a direct link in a device-to-device (D2D), peer-to-peer (P2P), vehicle-to-vehicle (V2V) network, vehicle-to-everything (V2X), and/or in a mesh network. In a mesh network example, UEs 240 and 242 may optionally communicate directly with one another in addition to communicating with a scheduling entity (e.g., UE 238).

In some examples, UE 238 may be a transmitting sidelink device that reserves resources on a sidelink carrier for the transmission of sidelink signals to UEs 240 and 242 in a D2D or V2X network. Here, UEs 240 and 242 are each receiving sidelink devices. UEs 240 and 242 may, in turn, reserve additional resources on the sidelink carrier for subsequent sidelink transmissions.

In other examples, UEs 238, 240, and 242 may be P2P devices (e.g., Bluetooth, Zigbee, or Near Field Communication (NFC) devices) communicating over a P2P carrier. For example, UEs 238, 240, and 242 may be Bluetooth devices that communicate over a short-wavelength (e.g., 2.45 GHz) carrier. Each Bluetooth device (e.g., UEs 238, 240, and 242) may operate at low power (e.g., 100 mW or less) to communicate over a short-range distance (e.g., 10 meters or less). In a Bluetooth network, the UEs 238, 240, and 242 may form an ad-hoc piconet and each pair of UEs (e.g., UEs 238 and 240; UEs 238 and 242; and UEs 240 and 242) may communicate over a different frequency in a frequency-hopping manner. Within the piconet, one of the UEs (e.g., UE 238) may function as the master, while the other UEs (e.g., UEs 240 and 242) function as slaves. Each of the UEs 238, 240, and 242 may automatically detect and connect to one another.

In some examples, two or more UEs (e.g., UEs 226 and 228) within the coverage area of a serving base station, such as base station 212, may communicate with both the base station 212 using cellular signals and with each other using direct link signals 227 (e.g., sidelink, Bluetooth, and/or other types of direct link signals) without relaying that communication through the base station 212. In an example of a V2X network within the coverage area of the base station 212, the base station 212 and/or one or both of the UEs 226 and 228 may function as scheduling entities to schedule sidelink communication between UEs 226 and 228.

Two primary technologies that may be used by V2X networks include dedicated short-range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to direct link (e.g., sidelink) networks other than V2X networks.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied, for example, to a DFT-s-OFDMA or an SC-FDMA waveform in substantially the same way as described herein below. That is, while some examples of the present disclosure may focus on an OFDM link for clarity, it should be understood that the same principles may be applied as well to DFT-s-OFDMA or SC-FDMA waveforms.

Figure 3:
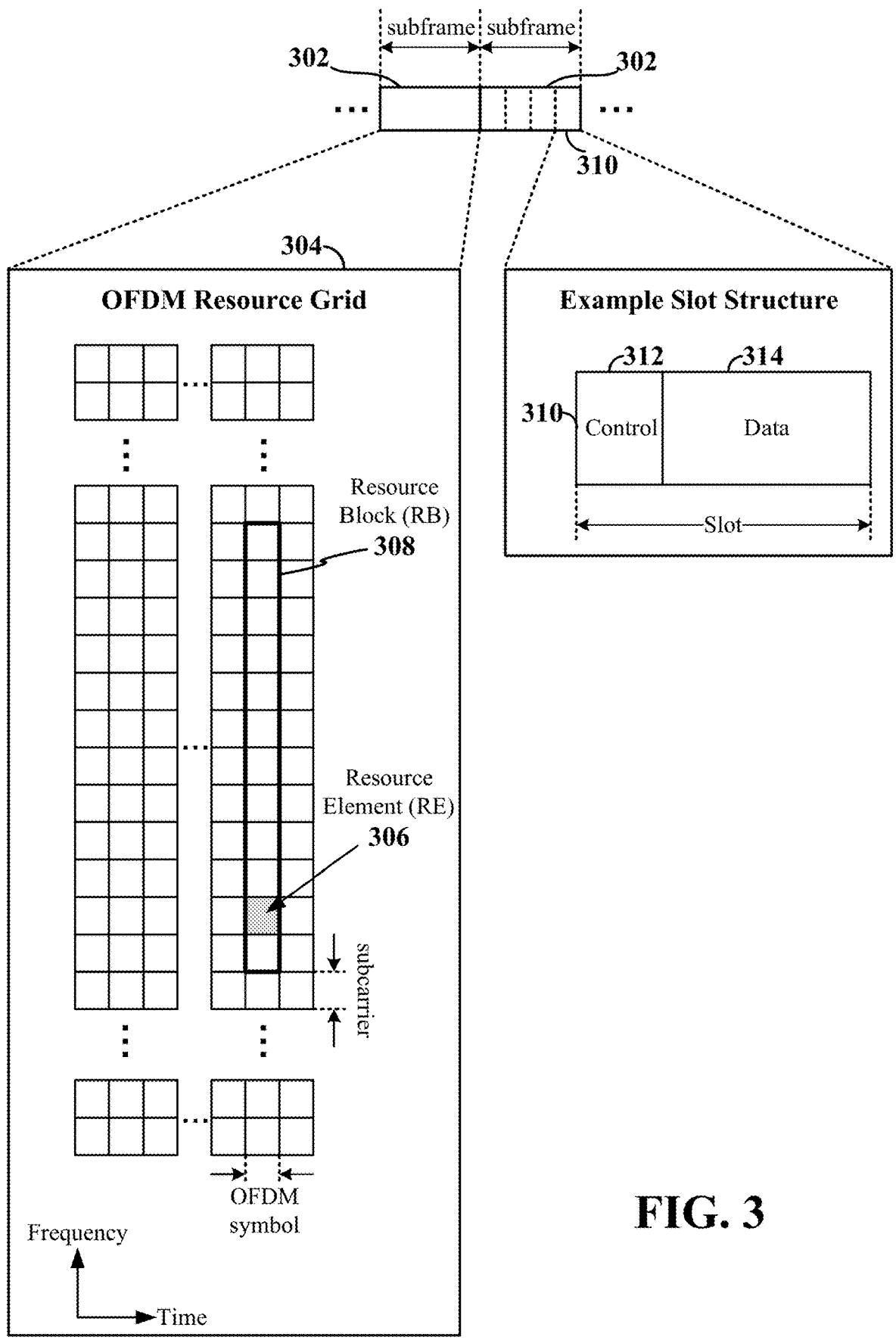
FIG. 3 is a schematic illustration of an organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. A RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

According to some examples, a frame may refer to a duration of 10 ms, with each frame sub-divided into 10 subframes 302 of 1 ms each. Each 1 ms subframe may consist of one or multiple adjacent slots. In the example shown in FIG. 3, subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., 1, 2, or 3 OFDM symbols). These mini-slots, or shortened TTIs, may in some cases be transmitted occupying resources scheduled for ongoing slot transmissions for the same or for different UEs. Any number of resource blocks may be utilized within a subframe or slot.

An expanded view of one of the slots 310 illustrates the slot as including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative-acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an acknowledgement (ACK) may be transmitted, whereas if not confirmed, a negative-acknowledgement (NACK) may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 140 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., Tx V2X or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above and illustrated in FIGS. 1-3 are not necessarily all the channels or carriers that may be utilized between a scheduling entity 108 and scheduled entities (e.g., one of more UE 106), and those of ordinary skill in the art will recognize that other channels or carriers may be utilized in addition to those illustrated, such as other traffic, control, and feedback channels.

In 5G NR, a physical downlink shared channel (PDSCH) may be repeated on a plurality of time domain resource allocation (TDRA) candidate occasions (e.g., on two or more TDRA candidate occasions) with different transmission configuration indicator (TCI) states. Each PDSCH repetition may carry the same transport block (TB). Here, a TCI state indicates quasi co-location (QCL) information for the PDSCH repetition. An example of a QCL type is QCL-TypeD, which indicates a spatial Rx parameter (e.g., spatial property of a beam on which the PDSCH repetition is transmitted). The spatial property of the beam may be inferred from an associated reference signal (e.g., synchronization signal block (SSB), channel state information-reference signal (CSI-RS), etc.) and may indicate, for example, at least one of a beam direction or a beam width. Each TCI state specifies an antenna downlink beam. Accordingly, if there are two TCI states configured for a PDSCH transmission to a UE, there may be two antenna downlink beams (e.g., two downlink beams emanating from a network access node such as a gNB toward a wireless communication device). Accordingly, two mini-slots may provide a wireless communication device with two PDSCH repetitions, one PDSCH repetition for each antenna downlink beam.

Prior to conveying data in a plurality of PDSCH repetitions, for example, a gNB may convey TDRA information to the wireless communication device. The TDRA information may be conveyed in downlink control information (DCI) within a PDCCH. The TDRA information defines, among other things, where a wireless communication device should expect to locate, in a slot, valid TDRA candidate occasions in the time domain. In some examples, only a first TDRA for a PDSCH first repetition is indicated to a wireless communication device by a gNB. The wireless communication device may reuse the first TDRA for a PDSCH second repetition by shifting the first TDRA by a fixed time gap.

As indicated above, PDSCHs are transmitted in a downlink from the network access node (e.g., base station, such as the gNB) to the wireless communication device in the downlink direction. As a consequence, the symbol positions in the portions of a slot carrying the PDSCH repetitions are generally configured for transmissions in the downlink direction. Nevertheless, because the same symbol positions used for PDSCH repetitions are used for other channels at other times, one or all of the symbols may have been, or will be, configured to handle traffic in the uplink direction. Additionally, the symbols for PDSCH data may have been allocated using semi-persistent-scheduling (SPS). With SPS, a given set of symbols may be allocated for periodic downlink data without needing to schedule each individual downlink transmission. After scheduling the periodic downlink data transmissions using SPS, some form of dynamic scheduling from an upper layer may override the previously established SPS. As a consequence, it is possible that a symbol, for example, of a mini-slot used for a PDSCH repetition, may be utilized to carry uplink data or uplink control. Consequently, if coordination is somehow lacking, it is possible for there to be a collision between data flowing in the downlink direction and data flowing in the uplink direction on the same symbol in a given slot.

In some examples, if any of a plurality of PDSCH repetitions collides with at least one symbol configured by a higher layer as an uplink symbol, the wireless communication device will skip decoding of all of the plurality of PDSCH repetitions and send a "fake" NACK to the network access node to memorialize the skipped decoding of all of the PDSCH repetitions. The NACK is referred to as "fake" because the NACK is not based on a decoding of the symbols per se; that is, the NACK is not based on actual decoding. Instead, the NACK is based on recognition of a non-decoding, or skipped decoding, event. The PDSCH repetitions that are not decoded are referred to as being "dropped."

The result of the dropped PDSCH repetition is a consequence of a rule in, for example, a semi-static acknowledgement/negative-acknowledgement (ACK/NACK) codebook, such as the type-1 codebook. The codebook indicates that the position of the ACK/NACK bit(s) for PDSCH repetitions are decided by the signaled TDRA for the PDSCH first repetition. If the PDSCH first repetition is dropped, due, for example, to a collision, the corresponding TDRA candidate occasions (for the remaining one or more additional PDSCH repetitions) will not be considered in the codebook construction and, hence, no position for corresponding ACK/NACK bit(s) is established for those remaining additional PDSCH repetitions. However, dropping a plurality of PDSCH repetitions, including both collided repetitions and the non-collided repetitions is inefficient.

In various aspects of the disclosure, in general, for mini-slot based repetition, a wireless communication device may receive downlink channel repetitions (e.g., PDSCH repetitions) and, if any of the downlink channel repetitions collides with an uplink symbol, or is otherwise not able to be decoded, none of the downlink channel repetitions will be dropped. The rules set out herein are exemplified for certain codebook types, for example codebook types 1 or 2, but the rules are not limited to these codebook types.

Figure 4:
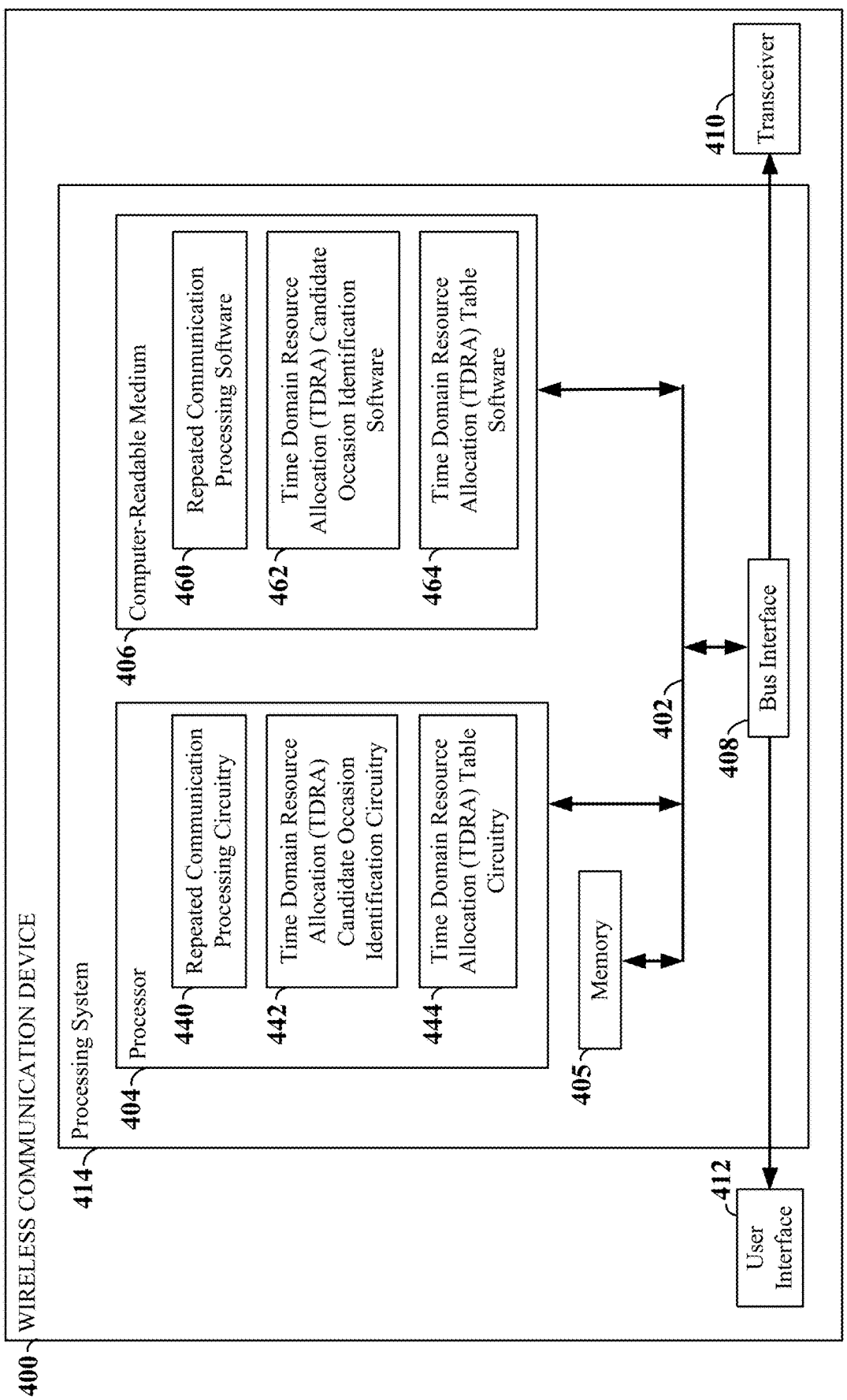
FIG. 4 is a block diagram illustrating an example of a hardware implementation of a wireless communication device employing a processing system according to some aspects.

FIG. 4 is a block diagram illustrating an example of a hardware implementation of a wireless communication device 400 (e.g., a UE, a scheduled entity) employing a processing system 414 according to some aspects. In accordance with various aspects of the disclosure, an element, or any portion of an element, or any combination of elements may be implemented with a processing system 414 that includes one or more processors, such as processor 404. For example, the wireless communication device 400 may correspond to any of the UEs, sidelink devices (e.g., D2D devices or V2X devices) and/or other suitable wireless communication devices shown in FIGS. 1 and/or 2.

The wireless communication device 400 may be implemented with a processing system 414 that includes one or more processors, such as processor 404. Examples of processors (e.g., processor 404) include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processor 404 may in some instances be implemented via a baseband or modem chip and in other implementations, the processor 404 may itself comprise a number of devices distinct and different from a baseband or modem chip (e.g., in such scenarios is may work in concert to achieve examples discussed herein). And as mentioned above, various hardware arrangements and components outside of a baseband modem processor can be used in implementations, including RF-chains, power amplifiers, modulators, buffers, interleavers, adders/summers, etc. In various examples, the wireless communication device 400 may be configured to perform any one or more of the functions described herein. That is, the processor 404, as utilized in a scheduled entity, such as the wireless communication device 400, may be used to implement any one or more of the processes described below and illustrated, for example, in FIGS. 6-8.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The computer-readable medium 406 may be referred to as a computer-readable storage medium, a non-transitory computer-readable medium, or a non-transitory computer-readable storage medium. The non-transitory computer-readable medium may store computer-executable code. The computer executable code may include code for causing a computer to implement one or more of the functions described herein. The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 may be a wireless transceiver. The transceiver 410 provides a communication interface or means for communicating with various other apparatus over a transmission medium. An antenna or antenna array (not shown) may be coupled to the transceiver 410 to transmit energy into and receive energy from the transmission medium. Depending upon the nature of the apparatus, a user interface 412 (e.g., keypad, display, speaker, microphone, joystick) may also be provided. Of course, such a user interface 412 is optional, and may be omitted in some examples.

The processor 404 may be responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software.

One or more processors, such as processor 404, in the processing system 414 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a nontransitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 404 may include repeated communication processing circuitry 440 configured for various functions, including, for example, identifying at least one of a plurality of repeated communications that is cancelled, receiving remaining repeated communications of the plurality of repeated communications that are not cancelled, and generating acknowledgment feedback information for the remaining repeated communications. In some examples, the repeated communications may include repeated PDSCHs, each including the same information. For example, the repeated communication processing circuitry 440 may be configured to implement one or more of the functions described below in relation to FIG. 6, including, e.g., blocks 602, 604, and 606. The repeated communication processing circuitry 440 may further be configured to execute repeated communication processing software 460 stored on the computer-readable medium 406 to implement one or more functions described herein including one or more of the functions described below in relation to FIG. 6, including, e.g., blocks 602, 604, and 606.

In some aspects of the disclosure, the processor 404 may include time domain resource allocation (TDRA) candidate occasion identification circuitry 442 configured for various functions, including, for example, identifying a plurality of TDRA candidate occasions, each TDRA candidate occasion occurring within a different respective one of a plurality of mini-slots of a slot. In addition, each of the plurality of mini-slots carries a different respective one of a plurality of downlink channel repetitions. For example, the TDRA candidate occasion identification circuitry 442 may be configured to implement one or more of the functions described below in relation to FIG. 7, including, e.g., block 702. The TDRA candidate occasion identification circuitry 442 may further be configured to execute TDRA candidate evaluation software 462 stored on the computer-readable medium 406 to implement one or more functions described herein including one or more of the functions described below in relation to FIG. 7, including, e.g., block 702.

In some aspects of the disclosure, the processor 404 may include time domain resource allocation (TDRA) table circuitry 444, configured for various functions, including, for example, maintaining, in a TDRA table, TDRA entries including starting symbols and lengths of TDRA candidate occasions used to determine ACK/NACK bit positions for feedback provided by the wireless communication device to, for example, a gNB. The feedback may be in the form of an ACK/NACK codebook (e.g., a Type-1 codebook), where the position of an ACK/NACK bit in the codebook may be determined based on the location of a TDRA candidate occasion associated with a downlink channel repetition. The location of the TDRA candidate occasion may be maintained as a TDRA entry in the TDRA table. For example, TDRA table circuitry 444 may be configured to implement one or more of the functions described below in relation to FIG. 7, including, e.g., block 704. The TDRA table circuitry 444 may further be configured to execute TDRA table software 464 stored on the computer-readable medium 406 to implement one or more functions described herein including one or more of the functions described below in relation to FIG. 7, including, e.g., block 704.

For mini-slot based repetition, the repeated communication processing circuitry 440, together with the TDRA candidate occasion identification circuitry 442 and TDRA table circuitry 444 may receive non-collided downlink channel repetitions and refrain from dropping those downlink channel repetitions even if other downlink channel repetitions collide with an uplink symbol. Toward this end, three examples may be considered.

According to a first example, a single ACK/NACK bit for a plurality of TDRA candidate occasions may be used. If any of the plurality of TDRA candidate occasions is able to be decoded, the single ACK/NACK bit may be used to return an ACK (e.g., return an ACK in an PUCCH report sent to a gNB) for all of the TDRA candidate occasions. According to this example, the wireless communication device may keep the TDRA for the first downlink channel repetition in a candidate TDRA set and may determine the position of the ACK/NACK bit in feedback, provided by the wireless communication device, based on the first downlink channel repetition location.

According to a second example, an ACK/NACK bit position (e.g., in feedback, provided by the wireless communication) associated with each downlink channel retransmission, may be determined for each of the downlink channel retransmissions (e.g., where each retransmission is found in a respective TDRA candidate occasion) based on TDRA entries in a TDRA table maintained by the wireless communication device. For a TDRA table having a first TDRA entry corresponding to a single PDSCH first repetition, a wireless communication device may extend the TDRA table by adding a new TDRA entry that corresponds to a PDSCH second repetition (and a third, etc.) after recognizing that the first TDRA entry is associated with the PDSCH first repetition. According to this example, each TDRA entry in the extended TDRA table may be used to determine an ACK/NACK bit position in feedback provided by the wireless communication device, related to the PDSCH repetition corresponding to the TDRA entry.

According to this example, the wireless communication device may report a NACK for each repetition of the downlink channel that is not decoded. Additionally, or alternatively, the wireless communication device may report an ACK/NACK for each repetition of the downlink channel based on whether the repetition of the downlink channel is decoded or not decoded, respectively. Additionally, or alternatively, the wireless communication device may report an ACK/NACK for the first downlink channel repetition and a NACK for a second downlink channel repetition without regard to whether the second downlink channel repetition was decoded. Additionally, or alternatively, the wireless communication device may report an ACK/NACK for the first downlink channel repetition and an ACK for the second downlink channel repetition without regard to whether the second downlink channel repetition was decoded. Additionally, or alternatively, the wireless communication device may report ACK/NACKs at positions determined by non-collided TDRA candidate occasions and NACKs at positions determined by collided TDRA candidate occasions.

According to a third example, a composite TDRA entry may be added to an existing TDRA table. According to this example, the existing (e.g., an original) TDRA table may be extended such that a first part of the extended TDRA table includes a TDRA entry associated with a first downlink channel repetition and a second part of the extended TDRA table includes a composite TDRA entry determined based on a combination of a plurality of downlink channel repetitions including at least the first downlink channel repetition and a second downlink channel repetition. According to this third example, the wireless communication device may further determine an ACK/NACK bit position to associate with the composite TDRA entry based on a starting symbol (S) of the composite TDRA entry and an entry length (L) of the composite TDRA entry. According to one example, the composite TDRA entry length (L) may be determined by summing each respective length of each TDRA entry mapped into the composite TDRA entry plus a sum of each respective gap between each consecutive pair of TDRA entries mapped into the composite TDRA entry.

Again, for a given mini-slot repetition sequence in a slot, if not all of the repetitions collide with uplink symbols, the non-collided repetitions will not be dropped. A wireless communication device may send an ACK/NACK bit(s) at position(s) determined by the composite entry. The wireless communication device may keep the composite TDRA entry in the candidate TDRA set and determine ACK/NACK bit positions if at least one TDRA candidate occasion of the plurality of TDRA candidate occasions has no conflict. Also, the wireless communication device may remove the composite TDRA if all TDRAs of all repetitions include at least one UL symbol. That is, if all repetitions have collisions.

Figure 5:
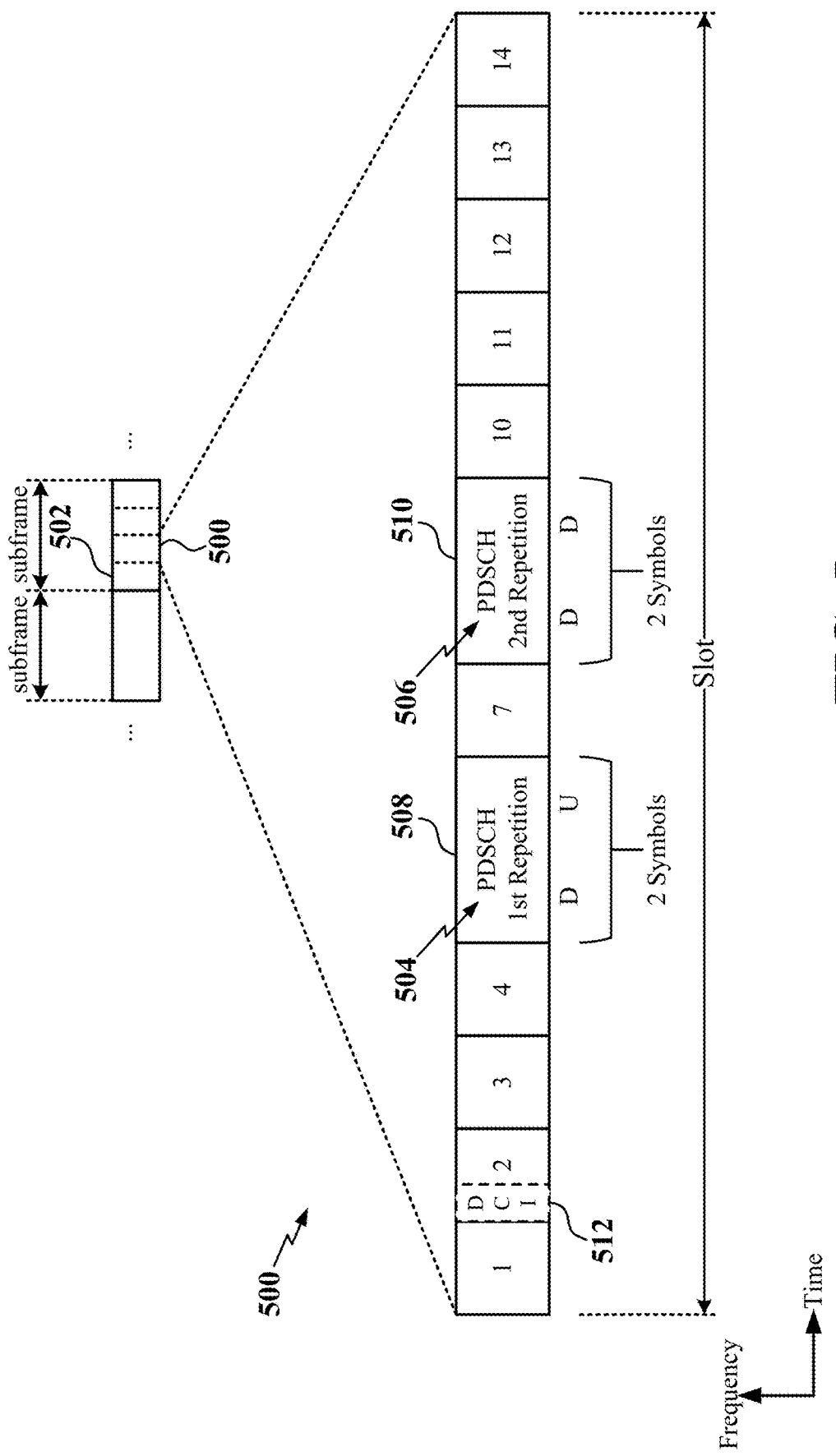
FIG. 5 depicts an example of a slot configured for single-downlink control information (DCI) based multiple transmission reception point (M-TRP) ultra-reliable low-latency communication (URLLC) scheme 3 and 4 according to some aspects.

FIG. 5 depicts a slot 500 of a subframe 502 configured for single-DCI based multi-transmission and reception point (M-TRP) ultra-reliable low-latency communication (URLLC) scheme 3 and 4 according to some aspects. In the example shown, there are fourteen symbols in the slot 500. According to this configuration, a maximum number of TCI states is 2. The PDSCH first repetition 504 and the PDSCH second repetition 506 correspond to the two TCI states. Resources are allocated in the time domain that support the same number of consecutive symbols being scheduled for each repetition as shown. In scheme 3, all repetitions are in a single slot (e.g., the slot 500), as presently implemented by a network, the PDSCH first repetition 504 and the PDSCH second repetition 506 will be dropped if either one of the repetitions is not able to be decoded (and dropped).

First mini-slot 508 and second mini-slot 510, each comprised of two consecutive symbols, are shown at symbols 5 and 6 and symbols 8 and 9. The first mini-slot 508 carries the PDSCH first repetition 504 and the second mini-slot 510 carries the PDSCH second repetition 506. A DCI 512 is depicted in the slot 500 for exemplary purposes. The DCI 512 is presented to indicate that the DCI 512 may precede the PDSCH first repetition 504 (and the PDSCH second repetition 506) in the slot 500 as shown or may occur in a preceding (earlier) slot (not shown). As described above, the DCI 512 may be used to convey the first valid TDRA candidate occasion for the PDSCH first repetition 504. That is, the first valid TDRA candidate occasion may be at symbols 5 and 6 in the slot 500 (corresponding to the first mini-slot 508). The TDRA informs a wireless communication device (e.g., wireless communication device 400 of FIG. 4) of the position (e.g., the TDRA candidate occasion) of the PDSCH first repetition 504 in the slot 500. The wireless communication device may determine the second TDRA candidate occasion by shifting the TDRA of the PDSCH first repetition 504 by a fixed time gap. In the example of FIG. 5, the fixed time gap may be that amount of time between the beginning of the fifth symbol and the beginning of the eighth symbol.

A collision situation is illustrated in FIG. 5, where, although the PDSCH first repetition 504 and the PDSCH second repetition 506 are configured to communicate data in the downlink direction, uplink data or uplink control information are nevertheless found at symbol 6 of slot 500. The PDSCH first repetition 504 is therefore dropped due to a collision between uplink data or uplink control information flowing from another wireless communication device in the uplink direction at the symbol 6 and downlink data flowing to the wireless communication device at the same symbol 6. In order to avoid dropping both the PDSCH first repetition 504 and the PDSCH second repetition 506, non-dropping rules may be implemented for mini-slot based repetition to improve efficiency.

By way of example, the different symbol directions for symbol 6 in slot 500 may be the result of a previously transmitted DCI including a slot format indicator (SFI) indicating that symbols 5, 6, 8, and 9 are downlink symbols (e.g., D, D, D, and D, respectively). In some examples, the SFI contained in the previously transmitted DCI may be established by a higher layer as a semi-persistently scheduled (SPS) pattern. The configuration of symbol 6 in the slot 500 for data transmission in the uplink (U) direction may then occur when the gNB transmits an additional DCI (e.g., a DCI format 2-0) including a SFI that indicates, for example, a symbol direction that overrides the previously established pattern given by the SPS scheduling. Consequently, the old pattern of D, D, D, D may be overwritten by the new pattern of D, U, D, D (as depicted in FIG. 5). As a consequence, a collision will occur at symbol 6, which is now configured for data traveling in an uplink (U) direction, despite being used to carry PDSCH data in a downlink direction.

Figure 6:
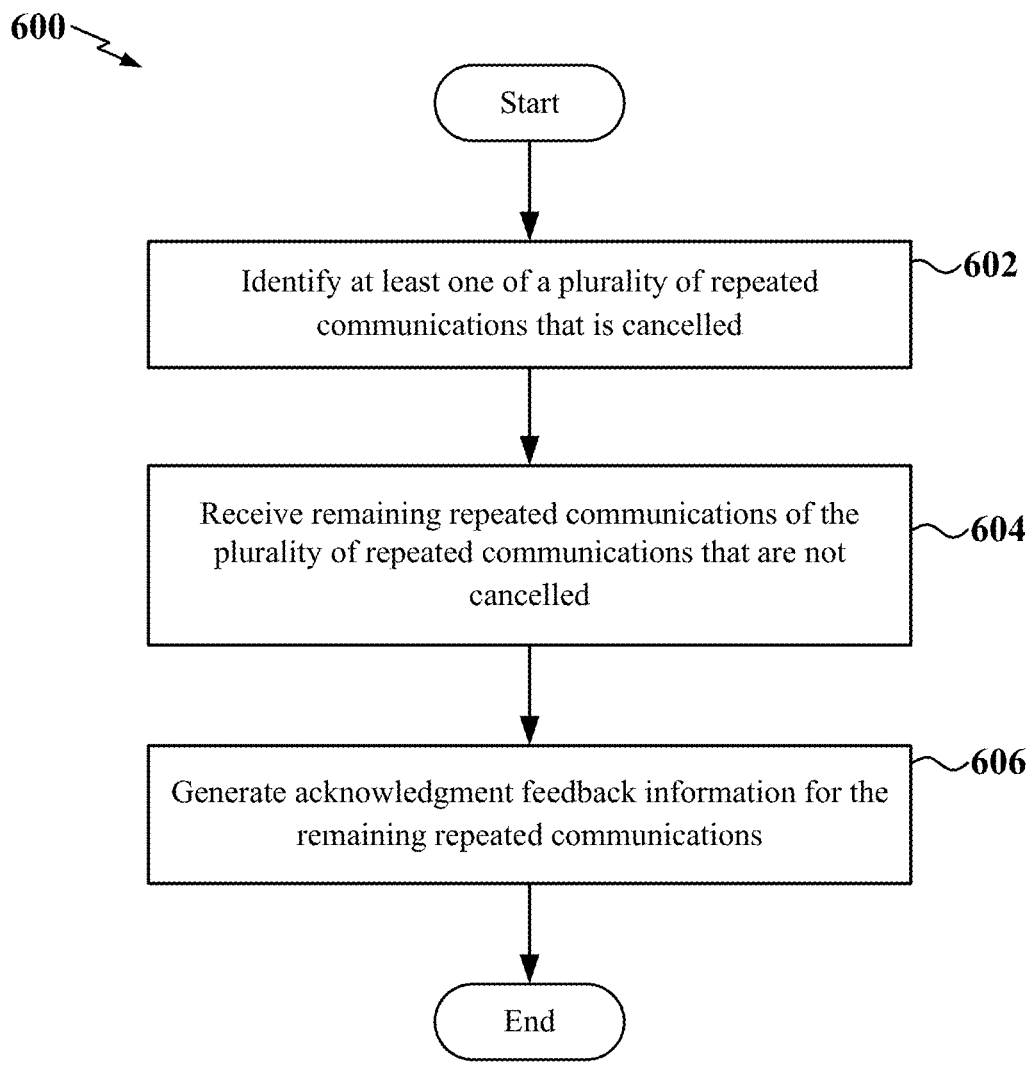
FIG. 6 is a flow chart illustrating an exemplary process for a wireless communication device to reserve resources for one or more transmissions of a packet over a sidelink according to some aspects.

FIG. 6 is a flow chart illustrating an exemplary process 600 (e.g., a method) for a wireless communication device to implement a non-dropping rule for mini-slot based repetition according to some aspects. As described below, some or all illustrated features may be omitted in a particular implementation within the scope of the present disclosure, and some illustrated features may not be required for implementation of all examples. In some examples, the process 600 (e.g., a method) may be carried out by the wireless communication device 400 illustrated in FIG. 4. In some examples, the process 600 may be carried out by any suitable apparatus or means for carrying out the functions or algorithm described below.

At block 602, the wireless communication device may identify at least one of a plurality of repeated communications that is cancelled. The plurality of repeated communications may be exemplified by the PDSCH first repetition 504 and the PDSCH second repetition 506 in FIG. 5. The PDSCH first repetition 504 is carried in the first mini-slot 508 and the PDSCH second repetition 506 is carried in the second mini-slot 510 of the slot 500 of FIG. 5. In the exemplary illustration, the first mini-slot 508 and the second mini-slot 510 are each comprised of two consecutive symbols. In some aspects, the wireless communication device may identify the at least one of the plurality of repeated communications by determining whether the at least one of the plurality of repeated communications is cancelled because of an overlap with a time resource indicated for another transmission. According to another aspect, the wireless communication device may identify the at least one of the plurality of repeated communications by determining whether the at least one of the plurality of repeated communications is cancelled by a preemption indicator or a cancellation indicator due to higher priority communication.

At block 604, the wireless communication device may receive remaining repeated communications of the plurality of repeated communications that are not cancelled. Referring to FIG. 5 for use as a non-limiting illustrative example of an application of the process 600, the plurality of repeated communications may be exemplified by the PDSCH first repetition 504 and the PDSCH second repetition 506. The at least one of the plurality of repeated receptions that may be cancelled may be the PDSCH first repetition 504. The PDSCH first repetition 504 may be cancelled for a predefined reason. For example, the PDSCH first repetition 504 may be overlapped with a time resource indicated for another transmission. In FIG. 5, the PDSCH first repetition 504 (received on symbols 5 and 6) overlaps with a time resource indicated for another transmission (e.g., symbol 6 is indicated for uplink transmission). The received remaining repeated communications that are not cancelled may be exemplified by the PDSCH second repetition 506.

At block 606, the wireless communication device may generate acknowledgement feedback information for the remaining repeated communications. The feedback information may be based on a reception result associated with each of the remaining repetitions. In one example the reception result may be a decoding result represented by an ACK (e.g., an actual ACK based on a successful decoding operation of the PDSCH second repetition 506) or a NACK (e.g., an actual NACK based on an unsuccessful decoding operation of the PDSCH second repetition 506).

According to aspects herein, the at least one of the plurality of repeated communication that is canceled may be identified based on a test that determines if the repeated communication satisfies a predefined rule. For example, a repeated communication may be canceled if the repeated communication overlaps with a time resource indicated for another transmission. In one example, the time resource for another transmission may be indicated by a slot format indicator (SFI). In another example, the time resource for another transmission may be indicated by a dynamic grant for scheduling transmission. Accordingly, returning to the illustration of FIG. 5, the time resource for another transmission (symbol 6 of the slot 500) may have been indicated by an SFI or a dynamic grant for scheduling transmission.

There may be other predefined rules for cancellation, in addition to, for example, the overlapping of a repeated communication with a time resource indicated for another transmission. For example, another predefined rule for cancellation may consider whether a given repeated communication is cancelled by a preemption indicator (PI) or a cancellation indicator (CI) due to higher priority communication. In 5G, for example, at least three generic services may be supported: enhanced mobile broadband (eMBB), massive machine-type communications (mMTC), and ultra-reliable and low latency communications (URLLC) (also referred to as mission-critical communications). By way of example, a gNB may send a PI to the wireless communication device to preempt reception of the PDSCH first repetition 504 because the gNB has an immediate need to use the resources previously scheduled for the PDSCH first repetition 504 for a mission-critical communication from or to another device.

According to certain aspects, the multiple repetition receptions received by the wireless communication device may be at least one of: dynamically scheduled by a first downlink control information (DCI), or repeated periodically after semi-persistent activation by a second DCI (e.g., use of semi-persistent scheduling (SPS) for resource scheduling). Accordingly, the wireless communication device may schedule the plurality of repeated communications dynamically according to the first received downlink control information (DCI), or schedule the plurality of repeated communications according to a periodic repetition after semi-persistent activation by the second DCI.

In some examples, the wireless communication device may send acknowledgement feedback information in a predefined type of hybrid automatic repeat request acknowledgement (HARQ ACK) information codebook. For example, the predefined type of HARQ ACK information codebook may be a type-1 codebook. Other types of codebooks are within the scope of the disclosure.

In one configuration, the wireless communication device 400 for wireless communication includes means for identifying at least one of a plurality of repeated communications that is cancelled, means for receiving remaining repeated communications of the plurality of repeated communications that are not cancelled, and means for generating acknowledgement feedback information for the remaining repeated communications. In one aspect, the aforementioned means may be the processor 404 shown in FIG. 4 and configured to perform the functions recited by the aforementioned means. In another aspect, the aforementioned means may be a circuit, or any apparatus configured to perform the functions recited by the aforementioned means.

Figure 7:
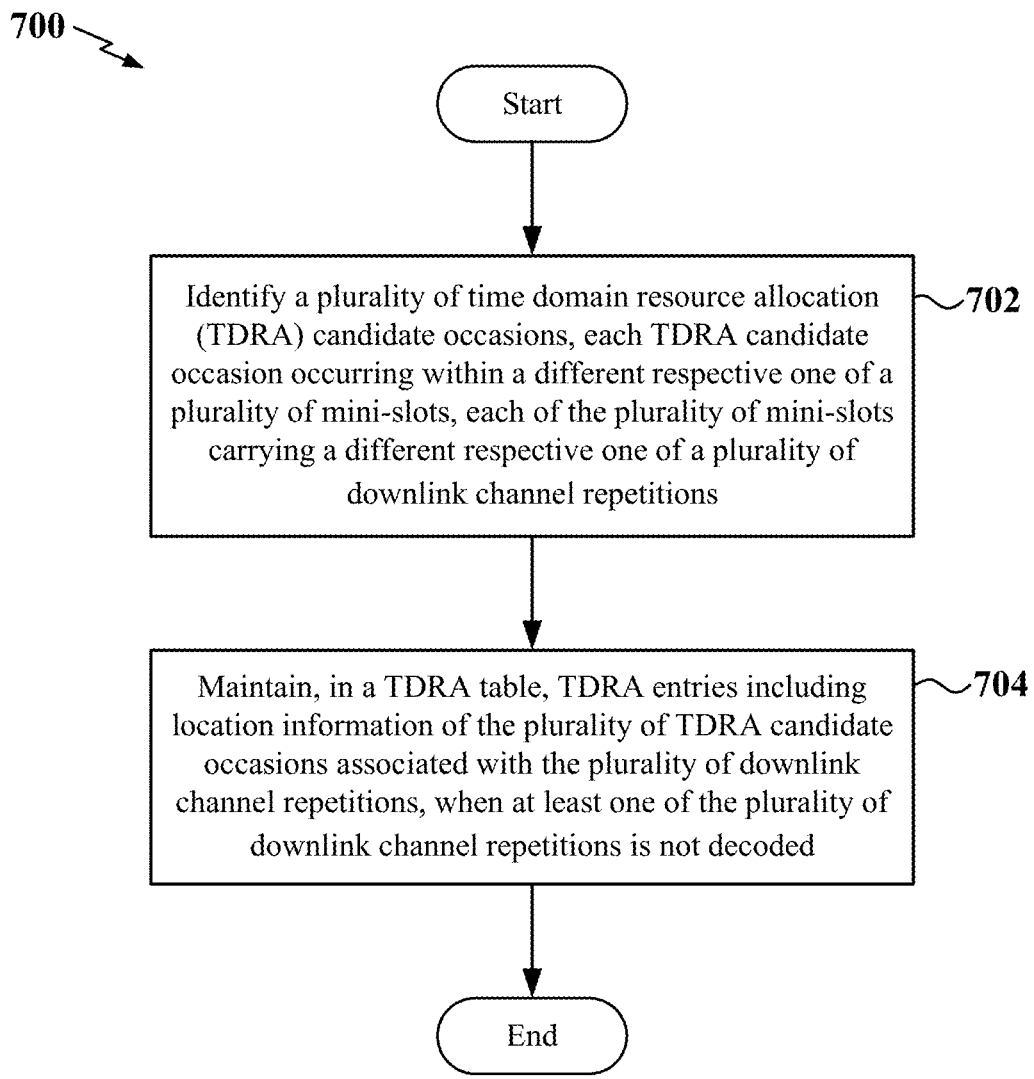
FIG. 7 is a flow chart illustrating an exemplary process for a wireless communication device to reserve resources for one or more transmissions of a packet over a sidelink according to some aspects.

FIG. 7 is a flow chart illustrating an exemplary process 700 (e.g., a method) for a wireless communication device to implement a non-dropping rule for mini-slot based repetition according to some aspects. As described below, some or all illustrated features may be omitted in a particular implementation within the scope of the present disclosure, and some illustrated features may not be required for implementation of all examples. In some examples, the process 700 (e.g., a method) may be carried out by the wireless communication device 400 illustrated in FIG. 4. In some examples, the process 700 may be carried out by any suitable apparatus or means for carrying out the functions or algorithm described below.

At block 702, the wireless communication device may identify a plurality of time domain resource allocation (TDRA) candidate occasions, each TDRA candidate occasion may occur within a different respective one of a plurality of mini-slots, each of the plurality of mini-slots carrying a different respective one of a plurality of downlink channel repetitions. At block 704, the wireless communication device may maintain, in a TDRA table, TDRA entries including location information of the plurality of TDRA candidate occasions associated with the plurality of downlink channel repetitions, when at least one of the plurality of downlink channel repetitions is not decoded.

Figure 8:
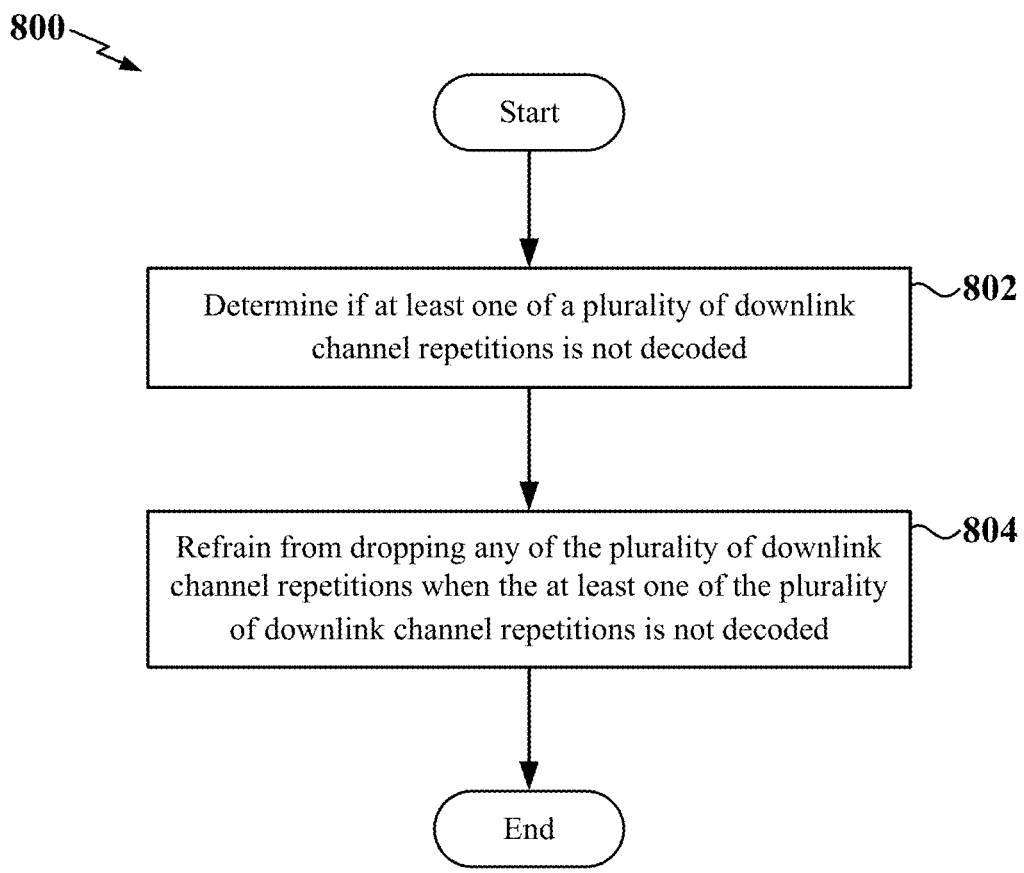
FIG. 8 is a flow chart illustrating an additional aspect of a process related to the exemplary process of FIG. 7 for a wireless communication device to implement a non-dropping rule for mini-slot based repetition according to some aspects.

FIG. 7 provides an illustration of a broad implementation of a rule according to some aspects. FIG. 8 is a flow chart illustrating an additional aspect of a process 800 (e.g., a method) related to the exemplary process 700 of FIG. 7, for a wireless communication device to implement a non-dropping rule for mini-slot based repetition according to some aspects. According to one aspect, at block 802, the wireless communication device may determine if at least one of the plurality of downlink channel repetitions is not decoded. At block 804, the wireless communication device may refrain from dropping any of the plurality of downlink channel repetitions when the at least one of the plurality of downlink channel repetitions is not decoded. According to one example, such as that illustrated in FIG. 5, the plurality of TDRA candidate occasions may be occur in one slot (e.g., the slot 500 of FIG. 5). The methods depicted in FIG. 6, FIG. 7, and FIG. 8 are exemplified for downlink channels in general. One example of a downlink channel may be a physical downlink shared channel (PDSCH).

According to some aspects, the process 700 of FIG. 7 may further include determining an acknowledgement/negative-acknowledgement (ACK/NACK) bit position to associate with feedback related to a given downlink channel repetition based on the location information in the TDRA table. Also, it is reiterated that the process 700 may further include refraining from dropping any of the plurality of TDRA opportunities if at least one repetition of the downlink channel is decoded (e.g., is not collided) even if at least one other repetition of the downlink channel is not decoded (e.g., is collided).

According to one aspect, the process 700 may further include determining that the at least one repetition of the downlink channel cannot be decoded based on at least one of a detection of a collision between uplink and downlink data or control in a downlink channel, a cancellation of a downlink channel repetition included in a slot format indicator (SFI), or a preemption indicator (PI) that preempts decoding of the downlink channel.

According to some aspects, the process 700 may further include expanding the TDRA table maintained at the wireless communication device by one additional TDRA table entry for each additional TDRA candidate occasion identified by the wireless communication device.

The concepts described herein may be extended for other situations. For example, if a subset of repetitions in mini-slot based PDSCH repetitions is cancelled by, for example a slot formation indicator (SFI) or pre-empted based on a pre-emption indication (PI), the remaining non-cancelled, non-pre-empted repetitions should not be dropped. In view of this concept extension, if a subset of repetitions is cancelled by SFI or PI, the wireless communication device may still receive the remaining non-cancelled, non-pre-empted repetitions in the sequence. In this case, the wireless communication device may send ACK/NACK bit(s) based on decoding results with the remaining repetitions. By way of example, for a type-1 codebook, the position of the ACK/NACK bit(s) may be determined based on any of the previously described examples.

According to another example, if a subset of repetitions is cancelled by SFI/PI, the wireless communication device may not receive the whole mini-slot based repetition sequence, in which case the wireless communication device may either send NACK bit(s) for the PDSCH repetition containing the cancelled PDSCH, or not send ACK/NACK bit(s) for the PDSCH repetition containing the cancelled PDSCH. Each example may be applied to all or a subset of all ACK/NACK codebook types (e.g., codebook type-1).

In one configuration, the wireless communication device 400 for wireless communication includes means for identifying a plurality of time domain resource allocation (TDRA) candidate occasions, each TDRA candidate occasion occurring within a different respective one of a plurality of mini-slots, each of the plurality of mini-slots carrying a different respective one of a plurality of downlink channel repetitions and means for maintaining, in a TDRA table, TDRA entries including location information of the plurality of TDRA candidate occasions associated with the plurality of downlink channel repetitions, when at least one of the plurality of downlink channel repetitions is not decoded. In one aspect, the aforementioned means may be the processor 404 shown in FIG. 4 and configured to perform the functions recited by the aforementioned means. In another aspect, the aforementioned means may be a circuit, or any apparatus configured to perform the functions recited by the aforementioned means.

Of course, in the above examples, the circuitry included in the processor 404 is merely provided as an example, and other means for carrying out the described functions may be included within various aspects of the present disclosure, including but not limited to the instructions stored in the computer-readable medium 406, or any other suitable apparatus or means described in any one of the FIGS. 1 and 2, and utilizing, for example, the processes and/or algorithms described herein in relation to FIGS. 6, 7, and/or 8.

The following provides an overview of aspects of the present disclosure:

Aspect 1: A method of wireless communication, the method comprising, at a wireless communication device: identifying at least one of a plurality of repeated communications that is cancelled; receiving remaining repeated communications of the plurality of repeated communications that are not cancelled; and generating acknowledgment feedback information for the remaining repeated communications.

Aspect 2: The method of aspect 1, further comprising: identifying the at least one of the plurality of repeated communications by determining whether the at least one of the plurality of repeated communications is cancelled because of an overlap with a time resource indicated for another transmission.

Aspect 3: The method of aspect 1 or 2, wherein the time resource for the other transmission is indicated by a slot format indicator.

Aspect 4: The method of aspect 1 or 2, wherein the time resource for the other transmission is indicated by a dynamic grant for scheduling transmission.

Aspect 5: The method of any of aspects 1 through 4, further comprising: identifying the at least one of the plurality of repeated communications by determining whether the at least one of the plurality of repeated communications is cancelled by a preemption indicator or a cancellation indicator due to higher priority communication.

Aspect 6: The method of any of aspects 1 through 5, further comprising: scheduling the plurality of repeated communications dynamically according to a first received downlink control information (DCI), or scheduling the plurality of repeated communications according to a periodic repetition after semi-persistent activation by a second DCI.

Aspect 7: The method of any of aspects 1 through 6, further comprising: sending the acknowledgement feedback information in a predefined type of hybrid automatic repeat request acknowledgement (HARQ ACK) information codebook.

Aspect 8: The method of any of aspects 1 through 7, wherein the predefined type of HARQ ACK information codebook is a type-1 codebook.

Aspect 9: A wireless communication device in a wireless communication network, comprising: a wireless transceiver, a memory, and a processor communicatively coupled to the wireless transceiver and the memory, wherein the processor and the memory are configured to perform a method of any one of aspects 1 through 8.

Aspect 10: A method of wireless communication, the method comprising, at a wireless communication device: identifying a plurality of time domain resource allocation (TDRA) candidate occasions, each TDRA candidate occasion occurring within a different respective one of a plurality of mini-slots, each of the plurality of mini-slots carrying a different respective one of a plurality of downlink channel repetitions; and maintaining, in a TDRA table, TDRA entries including location information of the plurality of TDRA candidate occasions associated with the plurality of downlink channel repetitions, when at least one of the plurality of downlink channel repetitions is not decoded.

Aspect 11: The method of aspect 10, further comprising: determining if at least one of the plurality of downlink channel repetitions is not decoded; and refraining from dropping any of the plurality of downlink channel repetitions when the at least one of the plurality of downlink channel repetitions is not decoded.

Aspect 12: The method aspect 10 or 11, further comprising: determining that at least one of the plurality of downlink channel repetitions is not decoded based on at least one of: a detection of a collision between uplink and downlink data or control in a downlink channel, a cancellation of a downlink channel repetition included in a slot format indicator, or a preemption indicator that preempts decoding of the downlink channel.

Aspect 13: The method of any of aspects 10 through 12, wherein the plurality of TDRA candidate occasions occur in one slot.

Aspect 14: The method of any of aspects 10 through 13, wherein a downlink channel is a physical downlink shared channel (PDSCH).

Aspect 15: The method of any of aspects 10 through 14, further comprising: determining an ACK/NACK bit position to associate with feedback related to a given downlink channel repetition based on the location information in the TDRA table.

Aspect 16: The method of any of aspects 10 through 15, further comprising: refraining from dropping any of the plurality of downlink channel repetitions if at least one of the plurality of downlink channel repetitions is decoded.

Aspect 17: The method of any of aspects 10 through 16, further comprising: expanding the TDRA table maintained at the wireless communication device by one additional TDRA table entry for each additional TDRA candidate occasion identified by the wireless communication device.

Aspect 18: The method of any of aspects 10 through 17, further comprising: at least one of: reporting a NACK for each repetition of the downlink channel that is not decoded; reporting a first ACK/NACK for each repetition of the downlink channel based on whether the repetition of the downlink channel is decoded or not decoded, respectively; reporting a second ACK/NACK for the first downlink channel and a NACK for a second downlink channel without regard to whether the second downlink channel was decoded; reporting a third ACK/NACK for the first downlink channel and an ACK for the second downlink channel without regard to whether the second downlink channel was decoded; or reporting a plurality of ACK/NACKs at ACK/NACK bit positions determined by non-collided TDRA candidate occasions and NACKs at ACK/NACK bit positions determined by collided TDRA candidate occasions.

Aspect 19: The method of any of aspects 10 through 18, further comprising: extending the TDRA table such that a first part of the extended TDRA table comprises a TDRA entry associated with a first downlink channel repetition and a second part of the extended TDRA table comprises a composite TDRA entry determined based on a combination of a plurality of downlink channel repetitions including at least the first downlink channel repetition and a second downlink channel repetition.

Aspect 20: The method any of aspects 10 through 19, further comprising: determining an acknowledgement/negative-acknowledgement (ACK/NACK) bit position to associate with the composite TDRA entry based on a starting symbol of the composite TDRA entry and an entry length of the composite TDRA entry.

Aspect 21: The method of any of aspects 10 through 20, further comprising: determining the entry length of the composite TDRA entry by summing each respective length of each TDRA entry mapped into the composite TDRA entry plus a sum of each respective gap between each consecutive pair of TDRA entries mapped into the composite TDRA entry.

Aspect 22: A wireless communication device in a wireless communication network, comprising: a wireless transceiver, a memory, and a processor communicatively coupled to the wireless transceiver and the memory, wherein the processor and the memory are configured to perform a method of any one of aspects 10 through 21.

Aspect 23: An apparatus configured for wireless communication comprising at least one means for performing a method of any one of aspects 1 through 8 or 10 through 21.

Aspect 24: A non-transitory computer-readable medium storing computer-executable code, comprising code for causing an apparatus to perform a method of any one of aspects 1 through 8 or 10 through 21.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-8 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1, 2, and/or 4 may be configured to perform one or more of the methods, features, or steps described herein, including those associated with FIGS. 6, 7, and/or 8. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, the method comprising, at a wireless communication device:
   identifying at least one of a plurality of repeated communications in a respective plurality of repeated mini-slots within a given slot that is cancelled;
   receiving remaining repeated communications of the plurality of repeated communications in the respective plurality of repeated mini-slots within the given slot that are not cancelled;
   generating acknowledgment feedback information for the remaining repeated communications; and
   sending the acknowledgment feedback information in a predefined type of hybrid automatic repeat request acknowledgment (HARQ ACK) information codebook.

2. The method of wireless communication of claim 1, further comprising:
   identifying the at least one of the plurality of repeated communications that is cancelled by determining whether the at least one of the plurality of repeated communications is cancelled because of an overlap with a time resource indicated for another communication, different from the at least one of the plurality of repeated communications.

3. The method of wireless communication of claim 2, wherein the time resource for the another communication is indicated by a slot format indicator.

4. The method of wireless communication of claim 2, wherein the time resource for the another communication is indicated by a dynamic grant for scheduling transmission.

5. The method of wireless communication of claim 1, further comprising:
   identifying the at least one of the plurality of repeated communications that is cancelled by determining whether the at least one of the plurality of repeated communications is cancelled by a preemption indicator or a cancellation indicator due to higher priority communication.

6. The method of wireless communication of claim 1, further comprising:
   scheduling the plurality of repeated communications dynamically according to a first received downlink control information (DCI), or
   scheduling the plurality of repeated communications according to a periodic repetition after semi-persistent activation by a second DCI.

7. The method of wireless communication of claim 1, wherein the predefined type of HARQ ACK information codebook is a type-1 codebook.

8. A wireless communication device in a wireless communication network, comprising:
   a wireless transceiver;
   a memory; and
   a processor communicatively coupled to the wireless transceiver and the memory, wherein the processor is configured to:
      identify at least one of a plurality of repeated communications in a respective plurality of repeated mini-slots within a given slot that is cancelled;
      receive remaining repeated communications of the plurality of repeated communications in the respective plurality of repeated mini-slots within the given slot that are not cancelled;
      generate acknowledgment feedback information for the remaining repeated communications; and
      send the acknowledgment feedback information in a predefined type of hybrid automatic repeat request acknowledgment (HARQ ACK) information codebook.

9. The wireless communication device of claim 8, wherein to identify the at least one of the plurality of repeated communications that is cancelled, the processor is are further configured to:
  determine whether the at least one of the plurality of repeated communications is cancelled because of an overlap with a time resource indicated for another communication, different from the at least one of the plurality of repeated communications.

10. The wireless communication device of claim 9, wherein the time resource for the another communication is indicated by a slot format indicator.

11. The wireless communication device of claim 9, wherein the time resource for the another communication is indicated by a dynamic grant for scheduling transmission.

12. The wireless communication device of claim 8, wherein to identify the at least one of the plurality of repeated communications that is cancelled, the processor is are further configured to:
  determine whether the at least one of the plurality of repeated communications is cancelled by a preemption indicator or a cancellation indicator due to higher priority communication.

13. The wireless communication device of claim 8, wherein the processor is further configured to:
  schedule the plurality of repeated communications dynamically according to a first received downlink control information (DCI), or
  schedule the plurality of repeated communications according to a periodic repetition after semi-persistent activation by a second DCI.

14. The wireless communication device of claim 8, wherein the predefined type of HARQ ACK information codebook is a type-1 codebook.

15. A wireless communication device, comprising:
  means for identifying at least one of a plurality of repeated communications in a respective plurality of repeated mini-slots within a given slot that is cancelled;
  means for receiving remaining repeated communications of the plurality of repeated communications in the respective plurality of repeated mini-slots within the given slot that are not cancelled;
  means for generating acknowledgment feedback information for the remaining repeated communications; and
  means for sending the acknowledgment feedback information in a predefined type of hybrid automatic repeat request acknowledgment (HARQ ACK) information codebook.

16. The wireless communication device of claim 15, wherein the means for identifying the at least one of the plurality of repeated communications that is cancelled further comprise:
  means for determining whether the at least one of the plurality of repeated communications is cancelled because of an overlap with a time resource indicated for another communication, different from the at least one of the plurality of repeated communications.

17. The wireless communication device of claim 16, wherein the time resource for the another communication is indicated by a slot format indicator.

18. The wireless communication device of claim 16, wherein the time resource for the another communication is indicated by a dynamic grant for scheduling transmission.

19. The wireless communication device of claim 15, wherein the means for identifying the at least one of the plurality of repeated communications that is cancelled further comprise:
  means for determining whether the at least one of the plurality of repeated communications is cancelled by a preemption indicator or a cancellation indicator due to higher priority communication.

20. The wireless communication device of claim 15, further comprising:
  means for scheduling the plurality of repeated communications dynamically according to a first received downlink control information (DCI), or means for scheduling the plurality of repeated communications according to a periodic repetition after semi-persistent activation by a second DCI.

21. The wireless communication device of claim 15, wherein the predefined type of HARQ ACK information codebook is a type-1 codebook.

22. A non-transitory computer readable medium storing instructions that when executed by a processing circuit cause the processing circuit to:
  identify at least one of a plurality of repeated communications in a respective plurality of repeated mini-slots within a given slot that is cancelled;
  receive remaining repeated communications of the plurality of repeated communications in the respective plurality of repeated mini-slots within the given slot that are not cancelled;
  generate acknowledgment feedback information for the remaining repeated communications; and
  send the acknowledgment feedback information in a predefined type of hybrid automatic repeat request acknowledgment (HARQ ACK) information codebook.

23. The non-transitory computer readable medium of claim 22, wherein to identify the at least one of the plurality of repeated communications that is cancelled, the instructions further cause the processing circuit to:
  determine whether the at least one of the plurality of repeated communications is cancelled because of an overlap with a time resource indicated for another communication, different from the at least one of the plurality of repeated communications.

24. The non-transitory computer readable medium of claim 23, wherein the time resource for the another communication is indicated by a slot format indicator.

25. The non-transitory computer readable medium of claim 23, wherein the time resource for the another communication is indicated by a dynamic grant for scheduling transmission.

26. The non-transitory computer readable medium of claim 22, wherein to identify the at least one of the plurality of repeated communications that is cancelled, the instructions further cause the processing circuit to:
  determine whether the at least one of the plurality of repeated communications is cancelled by a preemption indicator or a cancellation indicator due to higher priority communication.

27. The non-transitory computer readable medium of claim 22, wherein the instructions further cause the processing circuit to:
  schedule the plurality of repeated communications dynamically according to a first received downlink control information (DCI), or
  schedule the plurality of repeated communications according to a periodic repetition after semi-persistent activation by a second DCI.

28. The non-transitory computer readable medium of claim 22, wherein the predefined type of HARQ ACK information codebook is a type-1 codebook.

\* \* \* \* \*